United States Patent Office 3,743,744
Patented July 3, 1973

3,743,744
MEANS FOR INHIBITING SCOURS IN PIGLETS BY ADMINISTERING A SOURCE OF CITRATE IONS
John P. O'Donovan, Trenton, N.J., assignor to Schering Corporation, Bloomfield, N.J.
No Drawing. Filed Feb. 29, 1972, Ser. No. 230,462
Int. Cl. A61k 27/00
U.S. Cl. 424—317   8 Claims

ABSTRACT OF THE DISCLOSURE

Disclosed herein are compositions and methods useful for inhibiting scours in piglets under 22 days of age by providing them with about .35 to .75 gm. of citrate ion in their drinking water per day. Methionine is preferably co-administered with the citrate ion.

---

This invention relates to compositions and methods useful in inhibiting bacterial enteritis (herein called scours) in piglets. More particularly, the invention relates to the inhibition of scours using an orally administerable pharmaceutical composition containing a large amount of a water soluble, nontoxic source of citrate ions. A preferred embodiment includes the co-administration of methionine with the citrate ion.

Scours has long been a problem confronting the pig breeding industry. The condition is particularly prevalent in piglets under four weeks old and has as its overt manifestation servere diarrhea. Scours spreads rapidly from one piglet to another and if untreated may result in piglet mortality or a pig which does not have desirable market characteristics.

Presently, methods employed to treat scours include adding antibiotics to a standard basal nutrient feed supplement; the use of steroids (see U.S. Pat. 3,591,690); and the use of enzymes (see U.S. Pat. 3,081,225). Although all these presently known methods do to varying degrees control scours, they all have inherent disadvantages. For example, when treating scours with enzymes, the dosage unit must be manually administered to the individual animals and the method for preparing the medicament is tedious and relatively expensive. With regard to the antibiotic and steroid methods, substances are being added to the normal nutrient supplies of the piglets which are capable of leaving drug residues in the animal tissue upon slaughter.

The object of this invention is to provide compositions and methods useful for inhibiting scours in piglets under 22 days of age. It has been found that if one orally administers to piglets under 22 days of age on a daily basis through their drinking water a non-toxic, water soluble source of citrate ions so as to provide about .35 to .75 gm. of citrate ions per day per piglet the problem of scours is alleviated. It has additionally been found that the co-administration of methionine with the citrate ions produces an advantageous scours-inhibiting result.

In a preferred aspect, this invention is employed prophylactically by the daily administration to a piglet from birth to about 21 days of age of a composition containing at least .35 to .75 gm. of a non-toxic water soluble source of citrate ions.

The use of this invention is also contemplated in the case of those piglets that have not been prophylactically treated. If a previously untreated piglet develops scours, the condition may be alleviated by the administration of a composition of this invention from the onset of the condition until remission occurs, a process usually taking about 48 hours.

The above administration of citrate ions may be effected alone, in combination with methionine and/or in combination with a basal nutrient feed supplement for piglets.

In determining the quantity of each constituent of a scours-inhibiting composition of this invention, the calculations can be based upon the fact that a piglet consumes approximately 100 ml. of water per day.

The source of citrate ions may come from one or more suitable non-toxic, water soluble sources such as citric acid and sodium citrate.

Ferric ammonium citrate, presently used as a hematinic, may additionally provide a minor source of the citrate ions as the citrate level of this complex when used in its therapeutic dosage range as a hematinic is insufficient in itself to elicit the desired results of this invention.

The co-administration of methionine with the citrate ions has been found to be advantageous when present in sufficient quantity so as to provide about .05 to .20 gm. of methionine per day, per piglet. In other words, the ratio of methionine to citrate ions should be within the range of about 1 to 15 to about 1 to 2 by weight. Although the citrate ions, when used in accordance with the teachings of the invention, inhibits scours to a very high degree, the co-administration of the methionine produces a higher degree of inhibitions and as such is a preferred embodiment of this invention.

As used herein the term methionine includes the d, l, and dl-forms, although the dl form is preferred for economic reasons.

The term basal nutrient feed supplement is a standard term in the pig husbandry art and refers to a combination of essential and ancillary constituents combined so as to provide a balanced nutritional requirement for piglets and may include such constituents as minerals, e.g. iron supplements, vitamins, e.g. vitamin K and sources of energy (see Merck Veterinary Manual, 3rd ed., 1967).

EXAMPLE

The following formulation is illustrative of a basal nutrient feed supplement containing methionine and non-toxic, water soluble sources of citrate ion, wherein the citrate content represent greater than 50% by weight of the total composition. The formulation is so calculated that 12.5 gm. dissolved in one liter of drinking water gives 10 piglets the desired dosage level for each piglet of each constituent.

| | Gm. |
|---|---|
| Sodium citrate | 4000 |
| Citric acid | 2670 |
| Ferric ammonium citrate | 800 |
| dl-Methionine | 1000 |
| Menadione sodium bisulfite | 30 |
| Vitamin 7 (100,000 I.U./lb.) | 100 |
| Potassium phosphate dibasic | 600 |
| Copper sulfate | 300 |
| Sodium saccharin | 300 |
| Potassium sorbate | 100 |
| Starch | 1677 |
| Magnesium stearate | 23 |

The above formulation can be prepared by first mixing the magnesium stearate, sodium saccharin, copper sulfate, vitamin E and menadione sodium bisulfite. The remaining constituents are mixed in a separate blender, e.g. a Hobart blender. The second mixture is then added to the first mixture by geometric dilution and blended until a uniform mixture is obtained.

Twelve and one-half grams of the above formulation provides about 1 gram of methionine and 6 gms. of the citrate moiety.

The above formulation contains excipients such as sweetening agents and preservatives added for elegance and stability of the resultant composition.

In one test a group of piglets were each given a daily regimen of 1.25 gm. of the composition of the above formulation dissolved in 100 ml. of their drinking water from birth to 21 days of age. A corresponding control group of piglets was also observed. None of the piglets in the first group developed scours, whereas those in the second group developed scours.

Numerous variations of the above formulation and methods will be apparent to one skilled in the art and as such are contemplated as being within the scope of this invention.

I claim:

1. A method for inhibiting scours in piglets less than 22 days old which comprises the daily administration of a water soluble, non-toxic source of citrate ions in an amount sufficient to provide about .35 to .75 gm. of citrate ions per day per piglet in the drinking water of said piglets.

2. A method according to claim 1 wherein said administration is from the onset of scours until its remission.

3. A method according to claim 2 wherein about .05 to .20 gm. of methionine per day per piglet is co-administered.

4. A method according to claim 1 wherein said administration is from birth to 21 days of age.

5. A method according to claim 4 wherein about .05 to .20 gm. of methionine per day per piglet is co-administered.

6. A method according to claim 5 wherein a basal nutrient feed supplement is co-administered.

7. A composition for inhibiting scours in piglets less than 22 days old which comprises a non-toxic water soluble source of citrate ions and methionine wherein the ratio of citrate ion to methionine is in the range of 2 to 1 to about 15 to 1 by weight.

8. A composition according to claim 7 which additionally comprises a basal nutrient feed supplement.

References Cited

The Merck Veterinary Manual, 3rd edit. (1967), Merck & Co., pages 461–463.

SAM ROSEN, Primary Examiner